US012769583B2

(12) United States Patent
Liu et al.

(10) Patent No.: US 12,769,583 B2
(45) Date of Patent: Oct. 20, 2026

(54) TASK ALLOCATION METHOD, APPARATUS, STORAGE MEDIUM, AND ELECTRONIC DEVICE

(71) Applicant: ZHEJIANG DAHUA TECHNOLOGY CO., LTD., Hangzhou (CN)

(72) Inventors: Chao Liu, Hangzhou (CN); Wei Gao, Hangzhou (CN); Yuxin Zhou, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 563 days.

(21) Appl. No.: 18/227,888

(22) Filed: Jul. 28, 2023

(65) Prior Publication Data

US 2023/0376347 A1 Nov. 23, 2023

Related U.S. Application Data

(63) Continuation of application No. PCT/CN2021/131914, filed on Nov. 19, 2021.

(30) Foreign Application Priority Data

Jan. 29, 2021 (CN) ........................ 202110122249.X

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5083* (2013.01); *G06F 2209/5019* (2013.01); *G06F 2209/503* (2013.01)

(58) Field of Classification Search
CPC ................. G06F 9/4881; G06F 9/5083; G06F 2209/5019; G06F 2209/503
See application file for complete search history.

(56) References Cited

U.S. PATENT DOCUMENTS 8,768,678 B1 7/2014 Mihalache et al.

FOREIGN PATENT DOCUMENTS

CN 101976221 A 2/2011
CN 102495758 A 6/2012
(Continued)

OTHER PUBLICATIONS

Maheswaran et al., Dynamic Matching and Scheduling of a Class of Independent Tasks onto Heterogeneous Computing Systems, Calhoun, 1999, 16 pages. (Year: 1999).*
(Continued)

*Primary Examiner* — Diem K Cao

(57) ABSTRACT

Disclosed are task allocation method, an apparatus, a storage medium and an electronic device. The method includes: initializing allocation parameters, wherein the allocation parameters include the number of idle node devices in a target device cluster and the number of to-be-allocated task elements; performing simulated allocation on the to-be-allocated task elements to each idle node device for processing to generate a candidate scheduling matrix, wherein the candidate scheduling matrix is configured to indicate a simulated allocation result; obtaining a load balancing parameter corresponding to the candidate scheduling matrix, and determining a target scheduling matrix according to the load balancing parameter; and in response to the target scheduling matrix satisfying an allocation condition, allocating the to-be-allocated task elements to the idle node
(Continued)

devices according to the target scheduling matrix. The present disclosure can solve the technical problem of unbalanced task allocation.

18 Claims, 4 Drawing Sheets

(56) References Cited

FOREIGN PATENT DOCUMENTS

| | | | | | |
|---|---|---|---|---|---|
| CN | 106844053 | A | | 6/2017 | |
| CN | 107329815 | A | | 11/2017 | |
| CN | 108563498 | A | | 9/2018 | |
| CN | 108654089 | A | * | 10/2018 | ............ A63F 13/60 |
| CN | 109408236 | A | | 3/2019 | |
| CN | 110058924 | A | | 7/2019 | |
| CN | 111611080 | A | | 9/2020 | |
| CN | 111858029 | A | | 10/2020 | |
| CN | 112506669 | A | | 3/2021 | |
| CN | 112596902 | A | | 4/2021 | |
| EP | 3553656 | A1 | * | 10/2019 | ........... G06F 9/4881 |

OTHER PUBLICATIONS

Sukhoroslov et al., An experimental study of scheduling algorithms for many-task applications, Springer, 2018, pp. 7857-7871. (Year: 2018).*

Lianwan Li et al: "A particle swarm optimization-based container scheduling algorithm of docker platform", Communication and Information Processing, ACM, 2 Penn Plaza, Suite 701New YorkNY10121-0701USA, Nov. 2, 2018(Nov. 2, 2018), pp. 12-17, XP058428343, DOI: 10.1145/3290420.3290432; ISBN: 978-1-4503-6534-5; * abstract *, * p. 3 *, *p. 4, left-hand column *, *p. 2—right-hand column *.

Chinese First Office Action, Chinese Application No. 202110122249.X, mailed Mar. 24, 2021 (18 pages).

Chinese Second Office Action, Chinese Application No. 202110122249.X, mailed Apr. 20, 2021 (9 pages).

Chinese Notification to Grant Patent Right for Invention, Chinese Application No. 202110122249.X, mailed May 7, 2021 (3 pages).

European Search Report, European Application No. 21922476.3, mailed Feb. 9, 2024 (12 pages).

Research on Cloud Computing Resource Scheduling Based on Ant colony optimization algorithms , (12 pages), 2013.

Research and Implementation of Optimal Scheduling Algorithm for QoS Strategy based on Kubernetes Scheduler , (12 pages), 2018.

International Search Report, International Application No. PCT/CN2021/131914, mailed Feb. 22, 2022 (10 pages).

* cited by examiner

TASK ALLOCATION METHOD, APPARATUS, STORAGE MEDIUM, AND ELECTRONIC DEVICE

TECHNICAL FIELD

The present disclosure relates to the field of cloud computing technologies, and in particular to a task allocation method, an apparatus, a storage medium and an electronic device.

BACKGROUND

As an emerging virtualization technology, container technology has played an important role in the field of cloud computing and container cloud. The container technology can package applications into container images, enabling rapid deployment and operation of the applications in different environments, and improving the efficiency and performance of development. Compared with a conventional virtual machine, a container shares the host kernel and has a smaller granularity than the conventional virtual machine, while reasonable scheduling of containers and resource allocation have become the core functions of cloud computing and container cloud systems.

At present, a series of scheduling and orchestration management methods derived from container technology, such as kubernetes, Dockerswarm, and Mesosphere, are all aimed at large-scale container scheduling scenarios, that is, the scheduling and allocation of resources for the applications contained in the containers, with the application as a task allocation unit, and the allocation of nodes for the application in turn, in order to handle a task corresponding to an application in the allocated nodes. From the overall viewpoint, after the nodes are allocated, there will be some nodes in an idle state, resulting in a waste of resources, while some nodes are overloaded due to excessive application tasks, resulting in an unbalanced task allocation problem.

In view of the above-mentioned problems, no effective solutions have yet been proposed.

SUMMARY OF THE DISCLOSURE

The present disclosure provides a task allocation method, an apparatus, a storage medium and an electronic device, in order to at least solve the technical problem of unbalanced task allocation.

In a first aspect, the present disclosure provides a task allocation method, including: initializing allocation parameters, wherein the allocation parameters include the number of idle node devices in a target device cluster and the number of to-be-allocated task elements; performing simulated allocation on the to-be-allocated task elements to each idle node device for processing to generate a candidate scheduling matrix, wherein the candidate scheduling matrix is configured to indicate a simulated allocation result; obtaining a load balancing parameter corresponding to the candidate scheduling matrix, and determining a target scheduling matrix according to the load balancing parameter; and in response to the target scheduling matrix satisfying an allocation condition, allocating the to-be-allocated task elements to the idle node devices according to the target scheduling matrix.

In a second aspect, the present disclosure provides a task allocation apparatus, including: an initializing module, configured to initialize allocation parameters, wherein the allocation parameters include the number of idle node devices in a target device cluster and the number of to-be-allocated task elements; a simulating module, configured to perform simulated allocation on the to-be-allocated task elements to each idle node device for processing to generate a candidate scheduling matrix, wherein the candidate scheduling matrix is configured to indicate a simulated allocation result; a determining module, configured to obtain a load balancing parameter corresponding to the candidate scheduling matrix, and determining a target scheduling matrix according to the load balancing parameter; and an allocation module, configured to, in response to the target scheduling matrix satisfying an allocation condition, allocate the to-be-allocated task elements to the idle node devices according to the target scheduling matrix.

In a third aspect, the present disclosure provides a computer-readable storage medium, storing a program; wherein the program is configured to perform the method as described above when running.

In a fourth aspect, the present disclosure provides an electronic device, including a memory and a processor; wherein the memory stores a computer program, and the processor is configured to perform the method as described above through the computer program.

In the embodiments of the present disclosure, the number of task elements and the number of node devices are determined, and the candidate scheduling matrix indicating the allocation method is generated by the simulated allocation. The load balancing parameter is used to further obtain the target scheduling matrix, and when the target scheduling matrix satisfies the allocation condition, the task elements are allocated to the node devices according to the target scheduling matrix. All task elements and node devices are performed with the simulated allocation from a global perspective, and the allocation plan is optimized to obtain an allocation scheme corresponding to the target scheduling matrix with balanced load. The unified allocation of task elements and node devices is executed according to the optimal allocation scheme with balanced load, which achieves the purpose of allocating task elements to node devices in a balanced manner, thereby realizing the technical effect of allocating tasks to each node device in a balanced manner and solving the technical problem of unbalanced task allocation.

BRIEF DESCRIPTION OF THE DRAWINGS

The drawings described here are intended to provide a further understanding of the present disclosure and constitute a part of the present disclosure. The illustrative embodiments and descriptions of the present disclosure are intended to explain the present disclosure, and do not constitute an improper limitation of the present disclosure.

DETAILED DESCRIPTION

To enable those skilled in the art to better understand solutions of the present disclosure, the technical solutions in the embodiments of the present disclosure will be described clearly and completely in conjunction with the accompanying drawings in the embodiments of the present disclosure. Obviously, the described embodiments are only a part of the embodiments of the present disclosure, but not all of them. Based on the embodiments of the present disclosure, all other embodiments obtained by those skilled in the art without creative work shall fall within the scope of the present disclosure.

It should be noted that the terms “first” and “second” in the description and claims of the present disclosure and the above-mentioned drawings are intended to distinguish similar objects, and not necessarily to describe a specific sequence or order. It should be understood that the related elements may be interchanged under appropriate circumstances such that the embodiments of the present disclosure described herein are implemented in a sequence other than those illustrated or described herein. In addition, the terms “including” and “having” and any variations of them are intended to cover non-exclusive inclusions. For example, a process, method, system, product, or device that includes a series of steps or units is not necessarily limited to those clearly listed, but may include other steps or units that are not clearly listed or are inherent to the process, method, product, or equipment.

Figure 1:
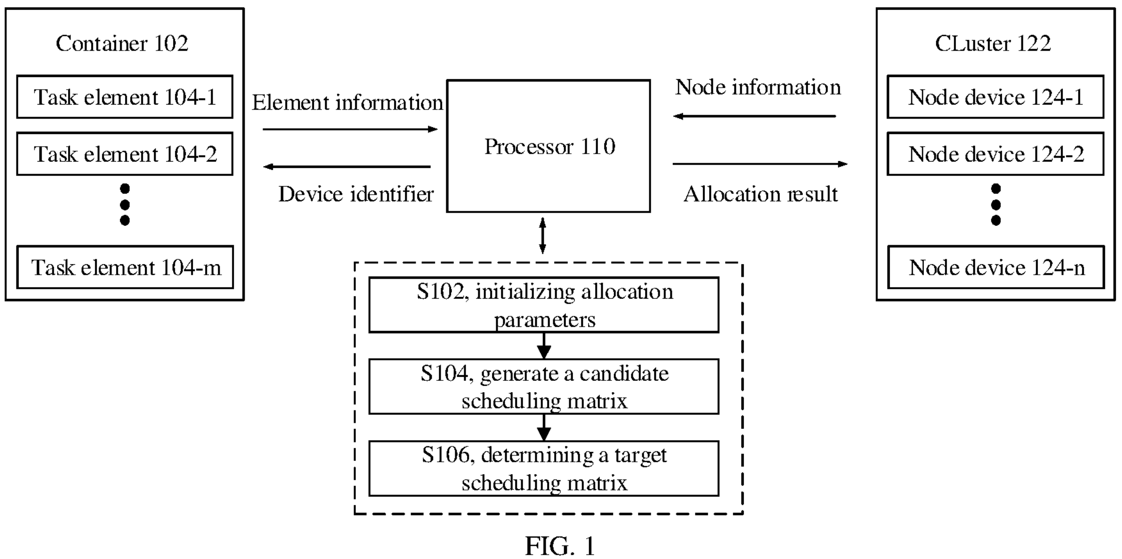
FIG. 1 is a schematic view of an application environment of a task allocation method according to an embodiment of the present disclosure.

According to an aspect of the embodiments of the present disclosure, a task allocation method is provided. In some embodiments, the above task allocation method may be, but is not limited to, applied to the environment as shown in FIG. 1. The container 102 contains m task elements 104, the cluster 122 contains n node devices 124, and the processor 110 allocates them task elements 104 to then node devices 124 by the task allocation method.

The container 102 sends element information of the contained task elements 104 to the processor 110, and the cluster 122 sends node information of the node devices 124 to the processor 110. When the processor 110 receives the element information and the node information, the processor 110 executes S102 to S106 in sequence: initializing allocation parameters, and performing simulated allocation on task elements to each node device for processing to generate a candidate scheduling matrix. In this case, a load balancing parameter corresponding to the candidate scheduling matrix is obtained, and a target scheduling matrix is determined according to the load balancing parameter.

When the processor 110 obtains the target scheduling matrix that satisfies an allocation condition, the processor 110 determines an allocation plan corresponding to the target scheduling matrix, and allocates the task elements 104 to the node devices 124 according to the allocation plan. The processor 110 sends a device identifier of a node device 124 to a corresponding task element 104, such that the corresponding task element 104 is allocated to the node device 124, and the node device 124 processes a processing operation corresponding to the task element 104.

In some embodiments, the processor 110 may be, but is not limited to, a terminal device or a server. The terminal device may include, but is not limited to, at least one of: mobile phone (such as Android phone, iOS phone, etc.), laptop, tablet, handheld computer, mobile internet device (MID), PAD, desktop computer, smart television, etc. The server may be a single server, a server cluster composed of multiple servers, or a cloud server. The foregoing is only an example, and the embodiments do not impose any limitation thereon.

Figure 2:
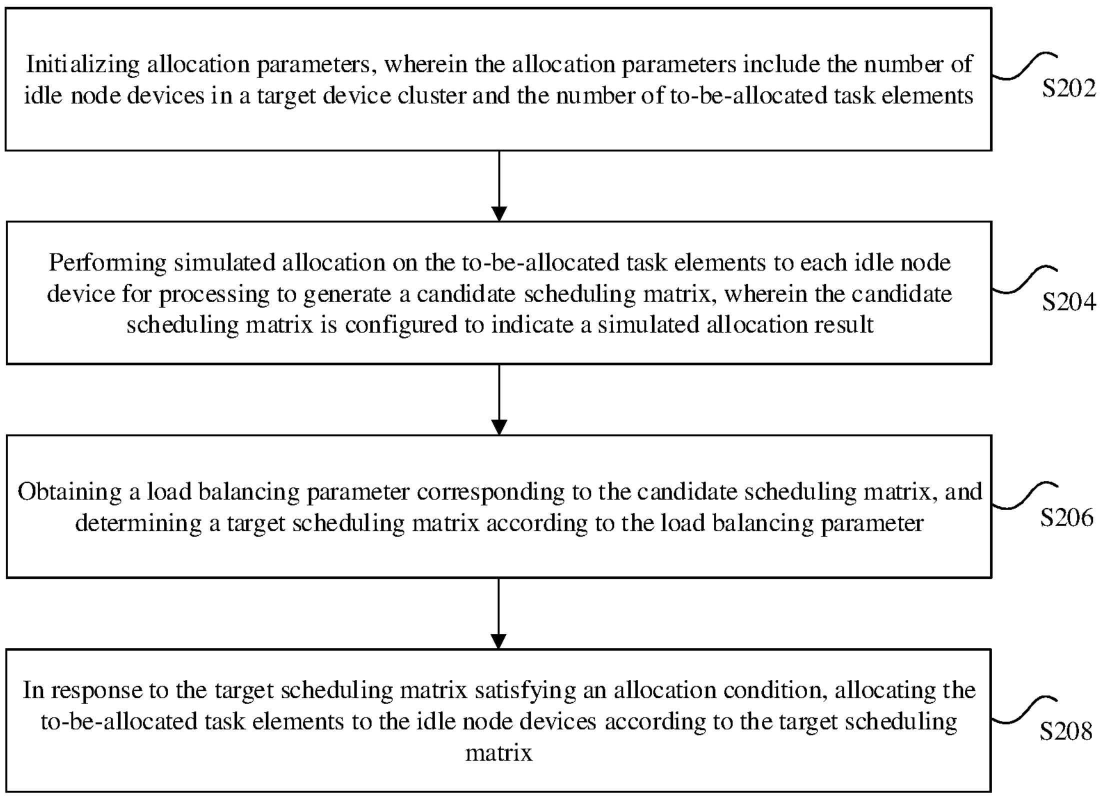
FIG. 2 is a flowchart of a task allocation method according to an embodiment of the present disclosure.

As an implementation manner, as shown in FIG. 2, the task allocation method may include operations at blocks as followed.

At block S202: initializing allocation parameters, wherein the allocation parameters include the number of idle node devices in a target device cluster and the number of to-be-allocated task elements.

At block S204: performing simulated allocation on the to-be-allocated task elements to each idle node device for processing to generate a candidate scheduling matrix, wherein the candidate scheduling matrix is configured to indicate a simulated allocation result.

At block S206: obtaining a load balancing parameter corresponding to the candidate scheduling matrix, and determining a target scheduling matrix according to the load balancing parameter.

At block S208: in response to the target scheduling matrix satisfying an allocation condition, allocating the to-be-allocated task elements to the idle node devices according to the target scheduling matrix.

In some embodiments, the allocation parameters are required to be clear in the task allocation method, and may include but are not limited to: the number of node devices in an idle state in the target device cluster, and the number of task elements to be allocated.

In some embodiments, each task element is a smallest unit that cannot be divided in an application task. In the application task, the task element may be, but is not limited to, a task element in an application unit, a task element in a Pod as a unit, and a task element in a processing task as a unit.

In some embodiments, the scheduling matrix may indicate a task allocation situation represented in the form of matrix data. The scheduling matrix can be, but is not limited to, a matrix composed of the number of task elements and the number of node devices. For example, in a case that the number of task elements is m and the number of node devices is n, the scheduling matrix may be an m×n matrix, which is configured to indicate the allocation situation between task elements and node devices.

In some embodiments, the candidate scheduling matrix may be, but is not limited to, a scheduling matrix updated and generated through simulated allocation based on an initial scheduling matrix. The candidate scheduling matrix may be, but is not limited to, a scheduling matrix determined from multiple scheduling matrices generated by the initial scheduling matrix according to different simulated allocation modes. The initial scheduling matrix is an initialized scheduling matrix before the allocation method is executed. Each value in the initialized scheduling matrix is the same, which can be but not limited to 0, to indicate that the task elements have not been allocated to the node devices.

In some embodiments, the load balancing parameter may be a balance index configured to indicate resource allocation on each node device in a simulated allocation mode corresponding to the scheduling matrix. The resources may include, but are not limited to, CPU resources and memory resources.

In some embodiments, the target scheduling matrix may be, but is not limited to, a scheduling matrix obtained after updating the candidate scheduling matrix according to the load balancing parameter. A maximum number of updates may be, but is not limited to, set during the process of initializing the allocation parameters, and is configured to indicate the number of times the candidate scheduling matrix is updated.

In some embodiments, the allocation condition may, but is not limited to, indicate that each task element is allocated to the node devices. The performance in the matrix may be, but is not limited to, that each row in the matrix has a scheduling value adjusted from an initial value to a target value indicating the allocation. For example, in a case that the initial value in the initialized matrix is 0, and the target value configured to indicate the allocation is 1, the allocation condition may be, but not limited to, that each row in the target scheduling matrix contains a value 1, and the rest of the rows are all 0.

In some embodiments, in a case that the target scheduling matrix does not satisfy the allocation condition, it is determined that the current number of node devices is not enough to generate the allocation plan, and resources of the target device cluster are insufficient.

In the embodiments of the present disclosure, the number of task elements and the number of node devices are determined, and the candidate scheduling matrix indicating the allocation method is generated by the simulated allocation. The load balancing parameter is used to further obtain the target scheduling matrix, and when the target scheduling matrix satisfies the allocation condition, the task elements are allocated to the node devices according to the target scheduling matrix. All task elements and node devices are performed with the simulated allocation from a global perspective, and the allocation plan is optimized to obtain an allocation scheme corresponding to the target scheduling matrix with balanced load. The unified allocation of task elements and node devices is executed according to the optimal allocation scheme with balanced load, which achieves the purpose of allocating task elements to node devices in a balanced manner, thereby realizing the technical effect of allocating tasks to each node device in a balanced manner and solving the technical problem of unbalanced task allocation.

As an implementation manner, the determining the target scheduling matrix according to the load balancing parameter includes:

- in response to the candidate scheduling matrix being not with a reached number of update times, updating the candidate scheduling matrix according to the load balancing parameter; and
- in response to the candidate scheduling matrix being with the reached number of update times, taking the candidate scheduling matrix as the target scheduling matrix.

In some embodiments, after obtaining the candidate scheduling matrix, the number of current update times is obtained, the number of current update times is compared with a preset maximum number of update times, and the candidate scheduling matrix is continued to be optimized and updated when the number of current update times is less than the maximum number of update times. The candidate scheduling matrix obtained by the current update is taken as the target scheduling matrix when the number of current update times is equal to the maximum number of update times.

In some embodiments, when the number of current update times is less than the maximum number of update times, it is determined whether the current candidate scheduling matrix satisfies the allocation condition. When the current candidate scheduling matrix satisfies the allocation condition, it is recorded that the current candidate scheduling matrix satisfies the allocation condition. When the current candidate scheduling matrix does not satisfy the allocation condition, the candidate scheduling matrix is continued to be optimized and updated.

In the embodiments of the present disclosure, the load balancing parameter is used to update and optimize the candidate scheduling matrix to obtain the candidate scheduling matrix with balanced load, and multiple optimization updates are performed to obtain a more optimized target scheduling matrix. In this way, the task elements are allocated to the node devices according to the target scheduling matrix, such that each node device can process allocated tasks in a balanced manner.

Figure 3:
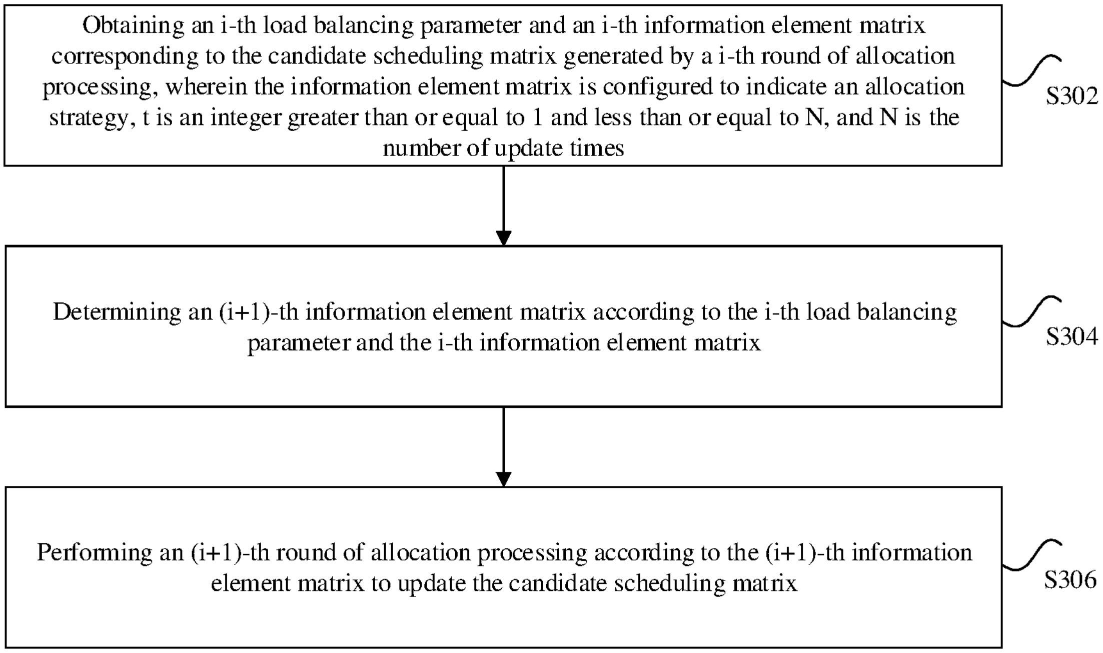
FIG. 3 is a flowchart of a task allocation method according to another embodiment of the present disclosure.

As an implementation manner, as shown in FIG. 3, the updating the candidate scheduling matrix according to the load balancing parameter may include operations at blocks as followed.

At block S302: obtaining an i-th load balancing parameter and an i-th information element matrix corresponding to the candidate scheduling matrix generated by a i-th round of allocation processing, wherein the information element matrix is configured to indicate an allocation strategy, t is an integer greater than or equal to 1 and less than or equal to N, and N is the number of update times.

At block S304: determining an (i+1)-th information element matrix according to the i-th load balancing parameter and the i-th information element matrix.

At block S306: performing an (i+1)-th round of allocation processing according to the (i+1)-th information element matrix to update the candidate scheduling matrix.

In some embodiments, the information element matrix may be a matrix composed of information element values. The information element value may be a value of a current information element generated by updating a value of a set initial information element according to the load balancing parameter. The value of the initial information element may be a value set according to the initial allocation parameter. The matrix composed of the values of the initial information elements may be an initial information element matrix.

In some embodiments, each task element corresponds to an information element matrix, and each task element and corresponding node device corresponds to an information element matrix. The number of information element values included in the information element matrix may be increased with the update, and the information element values obtained during each update are written into the information element matrix. The information element matrix contains the information element values of previous updates corresponding to the task element and the corresponding node device.

In some embodiments, the information element value may be configured to indicate a tendency of the allocation strategy.

In some embodiments, the candidate scheduling matrix generated in each round of allocation processing is the initial scheduling matrix of the next round of allocation processing. For example, in a case that the current allocation processing is the i-th round, then the initial scheduling matrix of the current allocation processing is the (i−1)-th candidate scheduling matrix generated in the (i−1)-th round, and the i-th round of allocation processing is to update the (i−1)-th candidate scheduling matrix to the i-th candidate scheduling matrix as the candidate scheduling matrix for the i-th round of allocation processing.

In the embodiments of the present disclosure, in the update process, the information element is used to influence the next update, and the candidate scheduling matrix is optimized and updated combined with the load balancing parameter, such that the candidate scheduling matrix is optimized and updated several times to form a scheduling matrix with balanced load.

Figure 4:
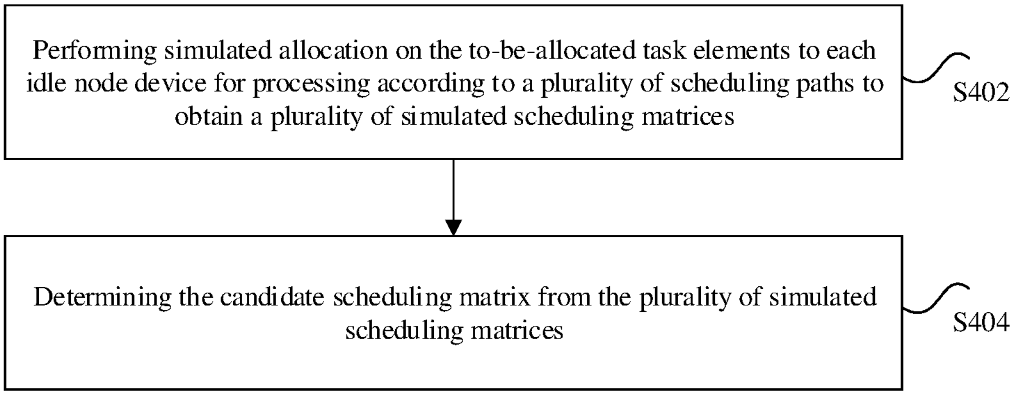
FIG. 4 is a flowchart of a task allocation method according to further another embodiment of the present disclosure.

As an implementation manner, as shown in FIG. 4, the performing simulated allocation on the to-be-allocated task elements to each idle node device for processing to generate the candidate scheduling matrix may include operations at blocks as followed.

At block S402: performing simulated allocation on the to-be-allocated task elements to each idle node device for processing according to a plurality of scheduling paths to obtain a plurality of simulated scheduling matrices.

At block 5404: determining the candidate scheduling matrix from the plurality of simulated scheduling matrices.

In some embodiments, each scheduling path corresponds to an allocation method. The number of scheduling paths may be but not limited to be set in the initial allocation parameters. The number of scheduling paths in each round of update may be the same, and correspondingly, the number of simulated scheduling matrices in each round of update is the same.

In some embodiments, a scheduling degree of each scheduling path may be, but not limited to, the same, and the scheduling degree is configured to indicate the number of task elements performed with the simulated allocation. The task elements are performed with the simulated allocation according to different scheduling results by the multiple scheduling paths.

Figure 5:
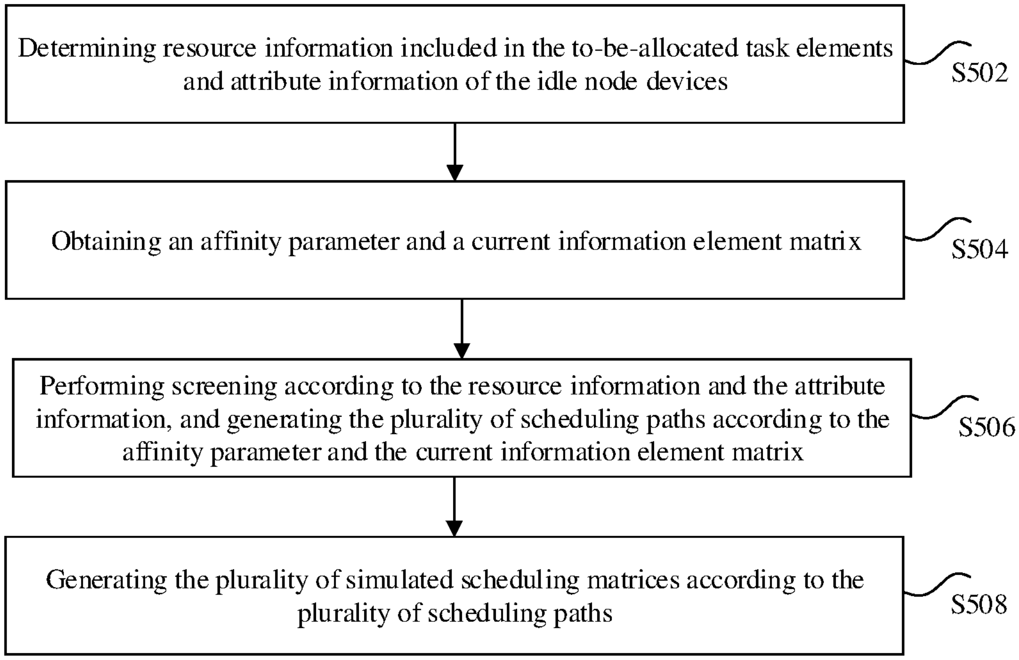
FIG. 5 is a flowchart of a task allocation method according to further another embodiment of the present disclosure.

As an implementation manner, as shown in FIG. 5, the performing simulated allocation on the to-be-allocated task elements to each idle node device for processing according to the plurality of scheduling paths to obtain the plurality of simulated scheduling matrices may include operations at blocks as followed.

At block S502: determining resource information included in the to-be-allocated task elements and attribute information of the idle node devices.

At block S504: obtaining an affinity parameter and a current information element matrix.

At block S506: performing screening according to the resource information and the attribute information, and generating the plurality of scheduling paths according to the affinity parameter and the current information element matrix.

At block S508: generating the plurality of simulated scheduling matrices according to the plurality of scheduling paths.

In some embodiments, the resource information includes resource catalog information, CPU information, and memory information.

In some embodiments, the attribute information includes information and label information used to indicate the current resource utilization rate of the node device. The label may be an attribute label used to indicate the node device, a preset classification label, and an affinity label.

In some embodiments, the affinity parameter includes a node device affinity, a task element affinity, and a task element anti-affinity. The affinity parameter may be a parameter determined according to an affinity tag. It is determined whether the task element has affinity with the node device according to the affinity tag included in the node device.

In some embodiments, the simulated allocation is performed on the task elements according to the affinity parameter and the values of the information elements in the current information element matrix. The simulated allocation of a task element is to determine, in a node device, whether to perform simulated allocation on the task element to the node device according to the affinity parameter and the information element corresponding to the task element and the node device. A single task element can traverse all node devices to find a node device most suitable for simulated allocation, but a task element can only be determined with one node device to perform simulated allocation.

Figure 6:
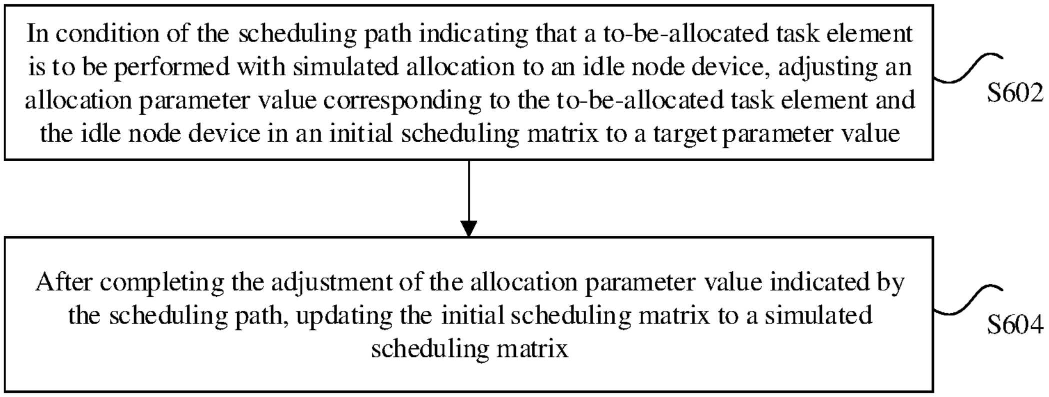
FIG. 6 is a flowchart of a task allocation method according to further another embodiment of the present disclosure.

As an implementation manner, as shown in FIG. 6, the generating the plurality of simulated scheduling matrices according to the plurality of scheduling paths may include operations at blocks as followed.

for each scheduling path:

At block S602: in condition of the scheduling path indicating that a to-be-allocated task element is to be performed with simulated allocation to an idle node device, adjusting an allocation parameter value corresponding to the to-be-allocated task element and the idle node device in an initial scheduling matrix to a target parameter value.

At block S604: after completing the adjustment of the allocation parameter value indicated by the scheduling path, updating the initial scheduling matrix to a simulated scheduling matrix.

In some embodiments, in a case that the number of scheduling paths is determined, S602 to S604 are performed for each scheduling path. When the scheduling path includes the simulated allocation of multiple task elements, each task element is allocated in turn, and the allocation parameter value corresponding to the task element and the simulatively allocated node device is adjusted to the target parameter value to complete the simulated allocation operations instructed by the scheduling path. For example, when the number of scheduling paths is A, and the index of the current scheduling path is a, then based on the initial scheduling matrix of this round, the allocation parameter values included in the path a are adjusted until all the allocation parameter values included in the path a are adjusted. The a-th simulated scheduling matrix is thus obtained. When a<A, a path with the index of a+1 is obtained, and on the basis of the initial scheduling matrix of this round, the simulated allocation is performed according to the path a+1 to obtain a (a+1)-th simulated scheduling matrix.

In some embodiments, the allocation parameter value is a value of a position corresponding to a task element and a node device in the scheduling matrix. Taking the task element as pod and the node device as node as an example, the allocation parameter value may be but not limited to the following definitions.

$$\text{path}_{ij} = \begin{cases} 1, \text{ indicating that pod}_i \text{ is allocated to node}_j \\ 0, \text{ indicating that pod}_i \text{ is not allocated to node}_j \end{cases}, \quad (1)$$

$$0 < i \le m,\ 0 < j \le n$$

where $\text{pod}_i$ is a task element labeled with i, $\text{node}_j$ is a node device labeled with j, m is the number of task elements, and n is the number of node devices.

In some embodiments, the simulated allocation is to adjust the allocation parameter values related to the scheduling path in the initial scheduling matrix to the target parameter value to update the simulated scheduling matrix. In the initialized scheduling matrix, the allocation parameter values are all 0, which means that no simulated allocation is performed. The simulated allocation is to adjust the value of a position with labels corresponding to the task element and the node device from 0 to 1, which means that the task element is simulatively allocated to the corresponding node device to complete the simulated allocation of the task element.

In some embodiments, the allocation parameter values that are not involved in the scheduling path are not adjusted, and current allocation parameter values thereof are maintained.

Figure 7:
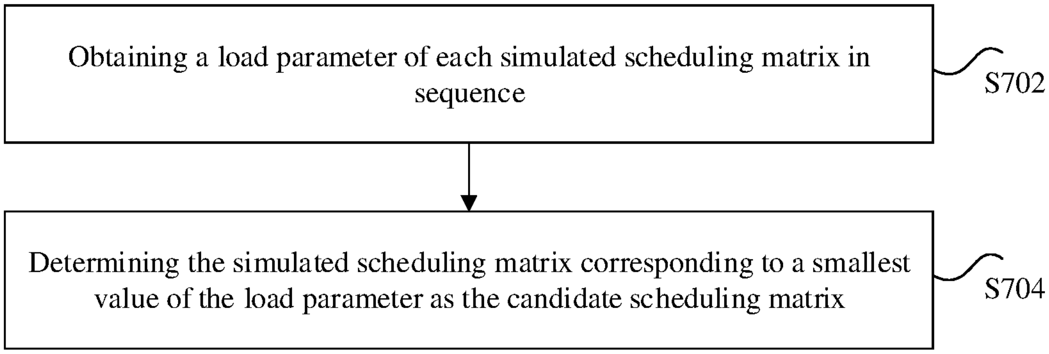
FIG. 7 is a flowchart of a task allocation method according to further another embodiment of the present disclosure.

As an implementation manner, as shown in FIG. 7, the determining the candidate scheduling matrix from the plurality of simulated scheduling matrices may include operations at blocks as followed.

At block S702: obtaining a load parameter of each simulated scheduling matrix in sequence.

At block S704: determining the simulated scheduling matrix corresponding to a smallest value of the load parameter as the candidate scheduling matrix.

In some embodiments, the load parameter is configured to indicate a load balancing rate of the simulated scheduling matrix. The calculation method of the load parameter may be but not limited to:

$$F = \frac{\Sigma_R \Sigma_{i=1}^{N} \left| U_i^R - U_{avg}^R \right|}{N} \quad (2)$$

$$U_{avg}^R = \frac{\Sigma_{i=1}^{NR} U_i^R}{N} \quad (3)$$

where N represents the total number of node devices, R represents the type of resources (CPU and memory), $$U_i^R$$

represents the utilization of the resource R on the i-th node device, and "||" represents a square operation.

In some embodiments, the smaller the value of the load parameter F, the better the load balancing effect.

In some embodiments, the simulated scheduling matrix corresponding to the smallest value of the load parameter F is determined as the candidate scheduling matrix. The load balancing parameter of the candidate scheduling matrix can be expressed as:

$$F_a = \mathrm{MIN}[F_1 \ldots F_A] \quad (4)$$

In some embodiments, the calculation method of the update of the information element in the information element matrix may be but not limited to:

$$p_{ij}^{t+1} = (1-q)p_{ij}^t + \frac{p_{max}}{F_a},\ \mathrm{path}_{ij} = 1 \quad (5)$$

where q represents an information element volatilization factor, which is a preset value; $p_{max}$ represents the initial value of the information element, $F_a$ represents the load balancing parameter in the current (t-th) round of update, and $$p_{ij}^t$$

represents the value of the information element of the i-th pod and the j-th node in the current (t-th) round of update.

In some embodiments, when the information element matrix is expressed as an information element matrix corresponding to both the task element and the node device, the information element matrix may be expressed as follows:

$$P = \left[p_{ij}^1, \ldots, p_{ij}^t, \ldots, p_{ij}^T\right],$$

where $$p_{ij}^t$$

represents the values of the information elements from the i-th pod to the j-th node in the t-th round of update.

In the embodiments of the present disclosure, multiple rounds of update on the candidate scheduling matrix are set. In each round of update, multiple scheduling paths are used to generate multiple simulated scheduling matrices based on the initial scheduling matrix of the current round, the candidate scheduling matrix with optimal balanced load is determined in the multiple simulated scheduling matrices, and next round of update is continued to be performed based on the candidate scheduling matrix. Through the scheduling matrices, multiple rounds of iterative updates are performed to obtain the target scheduling matrix with balanced load, such that task elements are allocated through the target scheduling matrix to make the resources of the allocated task elements on multiple node devices more balanced.

It should be noted that, for the sake of simple description, the foregoing method embodiments are all expressed as a series of action combinations, but those skilled in the art should know that the present disclosure is not limited by the described sequence of actions. According to the present disclosure, some steps can be performed in other order or simultaneously. In addition, those skilled in the art should also know that the embodiments described in the specification are all preferred embodiments, and the actions and modules involved are not necessarily required by the present disclosure.

Figure 8:
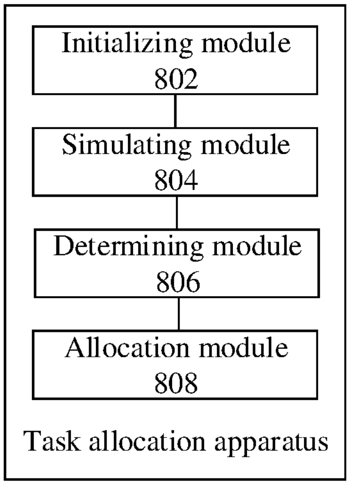
FIG. 8 is a structural schematic view of a task allocation apparatus according to an embodiment of the present disclosure.

According to another aspect of the embodiments of the present disclosure, a task allocation apparatus is provided for implementing the above task allocation method. As shown in FIG. 8, the apparatus may include:

an initializing module 802, configured to initialize allocation parameters, wherein the allocation parameters include the number of idle node devices in a target device cluster and the number of to-be-allocated task elements;

a simulating module 804, configured to perform simulated allocation on the to-be-allocated task elements to each idle node device for processing to generate a candidate scheduling matrix, wherein the candidate scheduling matrix is configured to indicate a simulated allocation result;

a determining module 806, configured to obtain a load balancing parameter corresponding to the candidate scheduling matrix, and determining a target scheduling matrix according to the load balancing parameter; and an allocation module 808, configured to, in response to the target scheduling matrix satisfying an allocation condition, allocate the to-be-allocated task elements to the idle node devices according to the target scheduling matrix.

In some embodiments, the determining module 806 of the task allocation apparatus includes:

an updating unit, configured to, in response to the candidate scheduling matrix being not with a reached number of update times, update the candidate scheduling matrix according to the load balancing parameter; and a calling unit, configured to, in response to the candidate scheduling matrix being with the reached number of update times, take the candidate scheduling matrix as the target scheduling matrix.

In some embodiments, the updating unit includes:

a generating unit, configured to obtain an i-th load balancing parameter and an i-th information element matrix corresponding to the candidate scheduling matrix generated by a i-th round of allocation processing, wherein the information element matrix is configured to indicate an allocation strategy, t is an integer greater than or equal to 1 and less than or equal to N, and N is the number of update times;

a determining unit, configured to determine an (i+1)-th information element matrix according to the i-th load balancing parameter and the i-th information element matrix; and a processing unit, configured to perform an (i+1)-th round of allocation processing according to the (i+1)-th information element matrix to update the candidate scheduling matrix.

In some embodiments, the allocation module 808 includes:

a simulating unit, configured to perform simulated allocation on the to-be-allocated task elements to each idle node device for processing according to a plurality of scheduling paths to obtain a plurality of simulated scheduling matrices; and a candidate unit, configured to determine the candidate scheduling matrix from the plurality of simulated scheduling matrices.

In some embodiments, the foregoing simulating unit includes:

an information determining unit, configured to determine resource information included in the to-be-allocated task elements and attribute information of the idle node devices;

a matrix obtaining unit, configured to obtain an affinity parameter and a current information element matrix;

a first generating unit, configured to perform screening according to the resource information and the attribute information, and generate the plurality of scheduling paths according to the affinity parameter and the current information element matrix; and a second generating unit, configured to generate the plurality of simulated scheduling matrices according to the plurality of scheduling paths.

In some embodiments, the second generating unit includes:

an execution unit, configured to execute the following steps in sequence for each scheduling path:

in condition of the scheduling path indicating that a to-be-allocated task element is to be performed with simulated allocation to an idle node device, adjusting an allocation parameter value corresponding to the to-be-allocated task element and the idle node device in an initial scheduling matrix to a target parameter value; and after completing the adjustment of the allocation parameter value indicated by the scheduling path, updating the initial scheduling matrix to a simulated scheduling matrix.

The candidate unit includes:

a parameter unit, configured to obtain a load parameter of each simulated scheduling matrix in sequence; and a comparing unit, configured to determine the simulated scheduling matrix corresponding to a smallest value of the load parameter as the candidate scheduling matrix.

In the embodiments of the present disclosure, the number of task elements and the number of node devices are determined, and the candidate scheduling matrix indicating the allocation method is generated by the simulated allocation. The load balancing parameter is used to further obtain the target scheduling matrix, and when the target scheduling matrix satisfies the allocation condition, the task elements are allocated to the node devices according to the target scheduling matrix. All task elements and node devices are performed with the simulated allocation from a global perspective, and the allocation plan is optimized to obtain an allocation scheme corresponding to the target scheduling matrix with balanced load. The unified allocation of task elements and node devices is executed according to the optimal allocation scheme with balanced load, which achieves the purpose of allocating task elements to node devices in a balanced manner, thereby realizing the technical effect of allocating tasks to each node device in a balanced manner and solving the technical problem of unbalanced task allocation.

Figure 9:
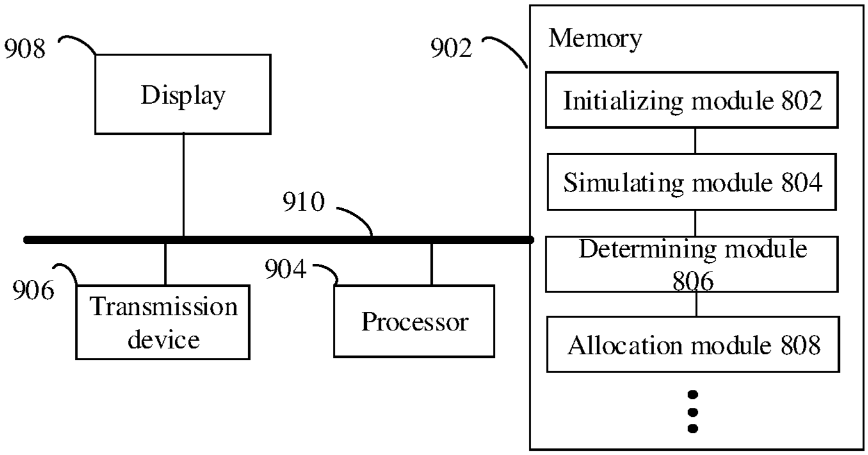
FIG. 9 is a structural schematic view of an electronic device according to an embodiment of the present disclosure.

According to another aspect of the embodiments of the present disclosure, an electronic device is provided for implementing the task allocation method, and the electronic device may be the processor shown in FIG. 1. In the embodiment, the electronic device is used as a processor as an example for description. As shown in FIG. 9, the electronic device includes a memory 902 and a processor 904. The memory 902 stores a computer program, and the processor 904 is configured to execute the steps in any of the foregoing method embodiments through the computer program.

In some embodiments, the electronic device may be located in at least one network device among multiple network devices in a computer network.

In some embodiments, the processor may be configured to execute the following steps through the computer program.

S1: initializing allocation parameters, wherein the allocation parameters include the number of idle node devices in a target device cluster and the number of to-be-allocated task elements.

S2: performing simulated allocation on the to-be-allocated task elements to each idle node device for processing to generate a candidate scheduling matrix, wherein the candidate scheduling matrix is configured to indicate a simulated allocation result.

S3: obtaining a load balancing parameter corresponding to the candidate scheduling matrix, and determining a target scheduling matrix according to the load balancing parameter.

S4: in response to the target scheduling matrix satisfying an allocation condition, allocating the to-be-allocated task elements to the idle node devices according to the target scheduling matrix.

In some embodiments, those skilled in the art can understand that the structure shown in FIG. 9 is only for illustration, and the electronic device may also be smart phone (such as Android phone, iOS phone, etc.), tablet, handheld computer, mobile internet device (MID), PAD and other terminal equipment. FIG. 9 does not limit the structure of the above-mentioned electronic device. For example, the electronic device may also include more or fewer components (such as a network interface, etc.) than shown in FIG. 9 or have a different configuration from that shown in FIG. 9.

The memory 902 may be configured to store software programs and modules, such as program instructions/modules corresponding to the task allocation method and apparatus in the embodiments of the present disclosure. The processor 904 executes the software programs and modules stored in the memory 902 to perform functional applications and data processing, i.e., realizing the task allocation method. The memory 902 may include a high-speed random access memory, and may also include a non-volatile memory, such as one or more magnetic storage devices, flash memory, or other non-volatile solid-state memory. In some embodiments, the memory 902 may further include a memory remotely arranged with respect to the processor 904, and the remote memory may be connected to the terminal through a network.

Examples of the networks include, but are not limited to, the Internet, corporate intranets, local area networks, mobile communication networks, and combinations thereof. The memory 902 may be specifically, but is not limited to, configured to store information such as task elements and node devices. As an example, as shown in FIG. 9, the memory 902 may include, but is not limited to, the initializing module 802, the simulating module 804, the determining module 806, and the allocation module 808 in the task allocation apparatus. In addition, the memory 902 may also include, but is not limited to, other module units in the task allocation apparatus, which will not be repeated herein.

In some embodiments, a transmission device 906 is configured to receive or send data via a network. The specific examples of networks may include wired networks and wireless networks. In an example, the transmission device 906 includes a network interface controller (NIC), which may be connected to other network devices and routers via a network cable so as to communicate with the Internet or a local area network. In an example, the transmission device 906 is a radio frequency (RF) module, which is configured to communicate with the Internet in a wireless manner.

In addition, the electronic device further includes: a display 908 for displaying task element information, node device information and allocation results; and a connection bus 910 for connecting various module components in the electronic device.

In other embodiments, the terminal device or server may be a node in a distributed system. The distributed system may be a blockchain system, and the blockchain system may be a distributed system formed by such nodes connected by means of network communication. Among them, the nodes may form a peer-to-peer (P2P) network, and any form of computing device, such as a server, terminal, etc., can become a node in the blockchain system by joining the peer-to-peer network.

According to another aspect of the present disclosure, a computer program product or computer program is provided. The computer program product or computer program includes computer instructions, and the computer instructions are stored in a computer-readable storage medium. A processor of the computer device reads the computer instructions from the computer-readable storage medium, and the processor executes the computer instructions, such that the computer device executes the methods provided in the various implementations of the foregoing task allocation aspect. The computer program is configured to execute the steps in any one of the foregoing method embodiments when running.

In some embodiments, the computer-readable storage medium may be configured to store the computer program for executing the following steps.

S1: initializing allocation parameters, wherein the allocation parameters include the number of idle node devices in a target device cluster and the number of to-be-allocated task elements.

S2: performing simulated allocation on the to-be-allocated task elements to each idle node device for processing to generate a candidate scheduling matrix, wherein the candidate scheduling matrix is configured to indicate a simulated allocation result.

S3: obtaining a load balancing parameter corresponding to the candidate scheduling matrix, and determining a target scheduling matrix according to the load balancing parameter.

S4: in response to the target scheduling matrix satisfying an allocation condition, allocating the to-be-allocated task elements to the idle node devices according to the target scheduling matrix.

In some embodiments, it is understood by those skilled in the art that all or some of the steps in the various methods of the above embodiments can be accomplished by instructing the hardware associated with the terminal device through a program that can be stored in a computer-readable storage medium, which can include: flash drive, read-only memory (ROM), random access (RAM), disk or CD-ROM, etc.

The sequence numbers of the above-mentioned embodiments of the present disclosure are only for description, and do not represent the advantages and disadvantages of the embodiments.

The integrated units in the above embodiments may be stored in the computer readable storage medium described above if they are implemented in the form of a software functional unit and sold or used as a separate product. Based on this understanding, the technical solution of the present disclosure, or the part of it that essentially contributes to the prior art or all or part of it, may be embodied in the form of a software product. The software product is stored in a storage medium, including a number of instructions to enable one or more computer devices (which may be personal computers, servers or network devices, etc.) to perform all or part of the steps of the various embodiments of the present disclosure.

In the above embodiments of the present disclosure, the description of each embodiment has its own focus. For parts that are not described in detail in an embodiment, reference may be made to related descriptions of other embodiments.

In several embodiments of the present disclosure, it should be understood that the disclosed client may be implemented in other ways. The apparatus embodiments described above are merely illustrative. For example, the division of the units is only a logical function division. In actual implementation, there may be other division methods, for example, multiple units or components may be combined or may be integrated into another system, or some features may be ignored or not implemented. In addition, the displayed or discussed mutual coupling or direct coupling or communication connection may be indirect coupling or communication connection through some interfaces, units or modules, and may be in electrical or other forms.

The units described as separate components may or may not be physically separated, and the components displayed as units may or may not be physical units, that is, they may be located in a same position, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit. The integrated unit can be implemented in the form of hardware or software functional unit.

The above are only preferred embodiments of the present disclosure. It should be noted that for those skilled in the art, without departing from the principle of the present disclosure, several improvements and modifications can be made, and these improvements and modifications should be regarded as within the scope of the present disclosure.

What is claimed is:

1. A task allocation method, comprising:

initializing allocation parameters, wherein the allocation parameters comprise the number of idle node devices in a target device cluster and the number of to-be-allocated task elements;

performing simulated allocation on the to-be-allocated task elements to each idle node device for processing to generate a candidate scheduling matrix, wherein the candidate scheduling matrix is configured to indicate a simulated allocation result;

obtaining a load balancing parameter corresponding to the candidate scheduling matrix, and determining a target scheduling matrix according to the load balancing parameter; and in response to the target scheduling matrix satisfying an allocation condition, allocating the to-be-allocated task elements to the idle node devices according to the target scheduling matrix;

wherein performing the simulated allocation on the to-be-allocated task elements to each idle node device for processing to generate the candidate scheduling matrix, comprises:

performing simulated allocation on the to-be-allocated task elements to each idle node device for processing according to a plurality of scheduling paths to obtain a plurality of simulated scheduling matrices, wherein the plurality of scheduling paths are generated according to an affinity parameter and a current information element matrix, the affinity parameter is configured to determine whether the to-be-allocated task elements have affinity with the idle node devices, and the current information element matrix corresponds to the to-be-allocated task elements and comprises information element values of previous updates corresponding to the to-be-allocated task elements; and determining the candidate scheduling matrix from the plurality of simulated scheduling matrices.

2. The method according to claim 1, wherein the determining the target scheduling matrix according to the load balancing parameter comprises:

in response to the number of current update times of the candidate scheduling matrix being less than a preset maximum number of update times, updating the candidate scheduling matrix according to the load balancing parameter; and in response to the number of current update times of the candidate scheduling matrix being equal to the preset maximum number of update times, taking the candidate scheduling matrix as the target scheduling matrix.

3. The method according to claim 2, wherein the updating the candidate scheduling matrix according to the load balancing parameter comprises:

obtaining a t-th load balancing parameter and a t-th information element matrix corresponding to the candidate scheduling matrix generated by a t-th round of allocation processing, wherein an information element matrix is configured to indicate an allocation strategy, t is an integer greater than or equal to 1 and less than or equal to T, and T is the number of update times;

determining a (t+1)-th information element matrix according to the t-th load balancing parameter and the t-th information element matrix; and performing a (t+1)-th round of allocation processing according to the (t+1)-th information element matrix to update the candidate scheduling matrix.

4. The method according to claim 1, wherein each scheduling path corresponds to an allocation method; a number of the plurality of scheduling paths is set in initial allocation parameters.

5. The method according to claim 1, wherein a scheduling degree of each scheduling path is the same, and the scheduling degree is configured to indicate a number of the to-be-allocated task elements performed with the simulated allocation.

6. The method according to claim 1, wherein the performing simulated allocation on the to-be-allocated task elements to each idle node device for processing according to the plurality of scheduling paths to obtain the plurality of simulated scheduling matrices comprises:

determining resource information included in the to-be-allocated task elements and attribute information of the idle node devices;

obtaining the affinity parameter and the current information element matrix;

performing screening according to the resource information and the attribute information; and generating the plurality of simulated scheduling matrices according to the plurality of scheduling paths.

7. The method according to claim 6, wherein the resource information comprises resource catalog information, CPU information, and memory information.

8. The method according to claim 6, wherein the attribute information comprises information and label information configured to indicate a current resource utilization rate of each idle node device.

9. The method according to claim 6, wherein the generating the plurality of simulated scheduling matrices according to the plurality of scheduling paths comprises:

for each scheduling path:

in condition of a scheduling path indicating that a to-be-allocated task element is to be performed with simulated allocation to an idle node device, adjusting an allocation parameter value corresponding to the to-be-allocated task element and the idle node device in an initial scheduling matrix to a target parameter value; and after completing the adjustment of the allocation parameter value indicated by the scheduling path, updating the initial scheduling matrix to a simulated scheduling matrix.

10. The method according to claim 1, wherein the determining the candidate scheduling matrix from the plurality of simulated scheduling matrices comprises:

obtaining a load parameter of each simulated scheduling matrix in sequence; and determining a simulated scheduling matrix corresponding to a smallest value of the load parameter as the candidate scheduling matrix.

11. A non-transitory computer-readable storage medium, storing a program; wherein when the program is executed by a processor, the processor is caused to perform:

initializing allocation parameters, wherein the allocation parameters comprise the number of idle node devices in a target device cluster and the number of to-be-allocated task elements;

performing simulated allocation on the to-be-allocated task elements to each idle node device for processing to generate a candidate scheduling matrix, wherein the candidate scheduling matrix is configured to indicate a simulated allocation result;

obtaining a load balancing parameter corresponding to the candidate scheduling matrix, and determining a target scheduling matrix according to the load balancing parameter; and in response to the target scheduling matrix satisfying an allocation condition, allocating the to-be-allocated task elements to the idle node devices according to the target scheduling matrix;

wherein performing the simulated allocation on the to-be-allocated task elements to each idle node device for processing to generate the candidate scheduling matrix, comprises:

performing simulated allocation on the to-be-allocated task elements to each idle node device for processing according to a plurality of scheduling paths to obtain a plurality of simulated scheduling matrices, wherein the plurality of scheduling paths are generated according to an affinity parameter and a current information element matrix, the affinity parameter is configured to determine whether the to-be-allocated task elements have affinity with the idle node devices, and the current information element matrix corresponds to the to-be-allocated task elements and comprises information element values of previous updates corresponding to the to-be-allocated task elements; and determining the candidate scheduling matrix from the plurality of simulated scheduling matrices.

12. The storage medium according to claim 11, wherein the determining the target scheduling matrix according to the load balancing parameter comprises:

in response to the number of current update times of the candidate scheduling matrix being less than a preset maximum number of update times, updating the candidate scheduling matrix according to the load balancing parameter; and in response to the number of current update times of the candidate scheduling matrix being equal to the preset maximum number of update times, taking the candidate scheduling matrix as the target scheduling matrix.

13. The storage medium according to claim 12, wherein the updating the candidate scheduling matrix according to the load balancing parameter comprises:

obtaining a t-th load balancing parameter and a t-th information element matrix corresponding to the candidate scheduling matrix generated by a t-th round of allocation processing, wherein an information element matrix is configured to indicate an allocation strategy, t is an integer greater than or equal to 1 and less than or equal to T, and T is the number of update times;

determining a (t+1)-th information element matrix according to the t-th load balancing parameter and the t-th information element matrix; and performing a (t+1)-th round of allocation processing according to the (t+1)-th information element matrix to update the candidate scheduling matrix.

14. The storage medium according to claim 11, wherein the performing simulated allocation on the to-be-allocated task elements to each idle node device for processing according to the plurality of scheduling paths to obtain the plurality of simulated scheduling matrices comprises:

determining resource information included in the to-be-allocated task elements and attribute information of the idle node devices;

obtaining the affinity parameter and the current information element matrix;

performing screening according to the resource information and the attribute information; and generating the plurality of simulated scheduling matrices according to the plurality of scheduling paths.

15. The storage medium according to claim 14, wherein the generating the plurality of simulated scheduling matrices according to the plurality of scheduling paths comprises:

for each scheduling path:

in condition of a scheduling path indicating that a to-be-allocated task element is to be performed with simulated allocation to an idle node device, adjusting an allocation parameter value corresponding to the to-be-allocated task element and the idle node device in an initial scheduling matrix to a target parameter value; and after completing the adjustment of the allocation parameter value indicated by the scheduling path, updating the initial scheduling matrix to a simulated scheduling matrix.

16. The storage medium according to claim 11, wherein the determining the candidate scheduling matrix from the plurality of simulated scheduling matrices comprises:

obtaining a load parameter of each simulated scheduling matrix in sequence; and determining a simulated scheduling matrix corresponding to a smallest value of the load parameter as the candidate scheduling matrix.

17. An electronic device, comprising a memory and a processor;

wherein the memory stores a computer program, and when the computer program is executed by the processor, the processor is caused to perform:

initializing allocation parameters, wherein the allocation parameters comprise the number of idle node devices in a target device cluster and the number of to-be-allocated task elements;

performing simulated allocation on the to-be-allocated task elements to each idle node device for processing to generate a candidate scheduling matrix, wherein the candidate scheduling matrix is configured to indicate a simulated allocation result;

obtaining a load balancing parameter corresponding to the candidate scheduling matrix, and determining a target scheduling matrix according to the load balancing parameter; and in response to the target scheduling matrix satisfying an allocation condition, allocating the to-be-allocated task elements to the idle node devices according to the target scheduling matrix;

wherein performing the simulated allocation on the to-be-allocated task elements to each idle node device for processing to generate the candidate scheduling matrix, comprises:

performing simulated allocation on the to-be-allocated task elements to each idle node device for processing according to a plurality of scheduling paths to obtain a plurality of simulated scheduling matrices, wherein the plurality of scheduling paths are generated according to an affinity parameter and a current information element matrix, the affinity parameter is configured to determine whether the to-be-allocated task elements have affinity with the idle node devices, and the current information element matrix corresponds to the to-be-allocated task elements and comprises information element values of previous updates corresponding to the to-be-allocated task elements; and determining the candidate scheduling matrix from the plurality of simulated scheduling matrices.

18. The electronic device according to claim 17, wherein the determining the target scheduling matrix according to the load balancing parameter comprises:

in response to the number of current update times of the candidate scheduling matrix being less than a preset maximum number of update times, updating the candidate scheduling matrix according to the load balancing parameter; and in response to the number of current update times of the candidate scheduling matrix being equal to the preset maximum number of update times, taking the candidate scheduling matrix as the target scheduling matrix.

* * * * *